(12) United States Patent
Zhu et al.

(10) Patent No.: US 11,451,321 B2
(45) Date of Patent: Sep. 20, 2022

(54) METHOD AND APPARATUS FOR UPLINK TRANSMISSION CONTROL (71) Applicant: Telefonaktiebolaget LM Ericsson (publ), Stockholm (SE)

(72) Inventors: Huaisong Zhu, Beijing (CN); Qi Qin, Beijing (CN); Christian Skärby, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/279,184

(22) PCT Filed: Sep. 28, 2018

(86) PCT No.: PCT/CN2018/108362
§ 371 (c)(1),
(2) Date: Mar. 24, 2021

(87) PCT Pub. No.: WO2020/062035
PCT Pub. Date: Apr. 2, 2020

(65) Prior Publication Data
US 2021/0399828 A1 Dec. 23, 2021

(51) Int. Cl.
*H04L 1/00* (2006.01)
*H04L 5/00* (2006.01)
(52) U.S. Cl.
CPC ............ *H04L 1/0007* (2013.01); *H04L 5/006* (2013.01)

(58) Field of Classification Search
CPC ..... H04L 1/0007; H04L 5/006; H04L 1/0011; H04L 1/0019; H04L 5/0053; H04L 1/0005
See application file for complete search history.

(56) References Cited

U.S. PATENT DOCUMENTS

2008/0207122 A1* 8/2008 Ahn ...................... H04W 52/04
455/39
2010/0135320 A1 6/2010 Tu et al.
(Continued)

FOREIGN PATENT DOCUMENTS

| CN | 101651527 A | 2/2010 |
| CN | 105519030 A | 4/2016 |

(Continued)

OTHER PUBLICATIONS

International Search Report and the Written Opinion of the International Searching Authority, issued in corresponding International Application No. PCT/CN2018/108362, dated Jun. 27, 2019, 9 pages.

(Continued)

*Primary Examiner* — Christine Ng
(74) *Attorney, Agent, or Firm* — Rothwell, Figg, Ernst & Manbeck, P.C.

(57) ABSTRACT

A method and an apparatus for uplink transmission control are disclosed. According to an embodiment, a base station determines a channel metric for indicating uplink channel condition between the base station and a terminal device. The base station determines an uplink transmission format that is to be used for an initial transmission from the terminal device, based on the channel metric such that a spectrum efficiency for the initial transmission can be maximized.

18 Claims, 7 Drawing Sheets

(56) References Cited

U.S. PATENT DOCUMENTS

| | | | | |
|---|---|---|---|---|
| 2010/0254276 | A1* | 10/2010 | Nishikawa | H04W 52/286 |
| | | | | 370/252 |
| 2016/0204908 | A1 | 7/2016 | Rafique et al. | |
| 2019/0052340 | A1* | 2/2019 | Yuan | H04B 7/086 |
| 2019/0068335 | A1* | 2/2019 | Li | H04W 72/1289 |
| 2019/0097747 | A1* | 3/2019 | Kim | H04J 14/0257 |

FOREIGN PATENT DOCUMENTS

| | | |
|---|---|---|
| WO | 2015050995 A2 | 4/2015 |
| WO | 2016206888 A1 | 12/2016 |
| WO | 2018059311 A1 | 4/2018 |

OTHER PUBLICATIONS

Woltering et al. "Link Level Performance Assessment of Reliability-Based HARQ Schemes in LTE" 2014 IEEE 79th Vehicular Technology Conference (VTC 2014-Spring), Seoul, Korea, May 18-21, 2014, XP055909362, 5 pages.

Huang et al. "MAC Scheduling for Multiuser Wireless Virtual Reality in 5G MIMO-OFDM Systems" 2018 IEEE International Conference on Communications Workshops (ICC Workshops), May 20, 2018, XP033369797, 6 pages.

Bertrand et al. "Link Adaptation Control in LTE Uplink" Vehicular Technology Conference (VTC Fall), 2012 IEEE, Sep. 3, 2012, XP032294638, 5 pages.

* cited by examiner

METHOD AND APPARATUS FOR UPLINK TRANSMISSION CONTROL

CROSS REFERENCE TO RELATED APPLICATION(S)

This application is a 35 U.S.C. § 371 National Phase Entry Application from PCT/CN2018/108362, filed Sep. 28, 2018, designating the United States, the disclosure of which is incorporated herein by reference in its entirety.

TECHNICAL FIELD

Embodiments of the disclosure generally relate to wireless communication, and, more particularly, to a method and an apparatus for uplink transmission control.

BACKGROUND

This section introduces aspects that may facilitate better understanding of the present disclosure. Accordingly, the statements of this section are to be read in this light and are not to be understood as admissions about what is in the prior art or what is not in the prior art.

In probability theory and information theory, the mutual information (MI) of two random variables is a measure of the mutual dependence between the two variables. More specifically, it quantifies the "amount of information" (in units such as shannons, more commonly called bits) obtained about one random variable, through the other random variable. The concept of MI is intricately linked to that of entropy of a random variable, a fundamental notion in information theory, which defines the "amount of information" held in a random variable.

In wireless communication, traditional link adaptation (LA) uses certain method usually like outer loop and inner loop to estimate a signal to interference plus noise ratio (SINR) value representing the wireless channel condition, then bases on this SINR value to map a modulation and coding scheme (MCS) which has a fixed block error rate (BLER) target, to keep the correctness of wireless transmission. From the perspective of information theory, the target of LA is trying to estimate an SINR value which representing the wireless channel condition, then to determine how much MI can be transmitted successfully (i.e. 10% BLER) in such SINR condition.

Even though traditional LA has a fixed BLER target to ensure the correctness of transmission, there still will be some decoding errors existed due to overestimation of the channel condition. Hybrid automatic repeat request (HARQ) is introduced into long term evolution (LTE) to further enhance the correctness. In LTE HARQ, there are two types of retransmissions: non-adaptive retransmission which must use the same PRB resource and MCS as the previous transmission, and adaptive retransmission which can use different PRB resource and MCS compared to the previous transmission.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for uplink transmission control.

According to one aspect of the disclosure, there is provided a method implemented at a base station. The method comprises determining a channel metric for indicating uplink channel condition between the base station and a terminal device. The method further comprises determining an uplink transmission format that is to be used for an initial transmission from the terminal device, based on the channel metric such that a spectrum efficiency for the initial transmission can be maximized.

In an embodiment of the disclosure, the method further comprises determining, for a retransmission for the initial transmission, an amount of residual mutual information (MI) which is to be transmitted in the retransmission. The method further comprises determining an amount of uplink transmission resource that is to be used for the retransmission from the terminal device, based on the channel metric and the amount of the residual MI.

In an embodiment of the disclosure, a maximum number of allowed retransmissions is one. Determining the amount of the uplink transmission resource comprises determining the amount of the uplink transmission resource based on the channel metric and the amount of the residual MI such that a success probability for the retransmission can be maximized.

In an embodiment of the disclosure, a maximum number of allowed retransmissions is equal to or greater than two and the retransmission is one of the last one or more retransmissions. Determining the amount of the uplink transmission resource comprises determining the amount of the uplink transmission resource based on the channel metric and the amount of the residual MI such that a success probability for the retransmission can be maximized.

In an embodiment of the disclosure, a maximum number of allowed retransmissions is equal to or greater than two and the retransmission is one of the first one or more retransmissions. Determining the amount of the uplink transmission resource comprises determining the amount of the uplink transmission resource based on the channel metric and the amount of the residual MI such that a spectrum efficiency for the retransmission can be maximized.

In an embodiment of the disclosure, the channel metric is SINR probability density. The uplink transmission format is determined based on a maximum SINR from the SINR probability density.

In an embodiment of the disclosure where a maximum number of allowed retransmissions is one, or where a maximum number of allowed retransmissions is equal to or greater than two and the retransmission is one of the last one or more retransmissions, the channel metric is SINR probability density. The amount of the uplink transmission resource is determined based on a minimum SINR from the SINR probability density.

In an embodiment of the disclosure where a maximum number of allowed retransmissions is equal to or greater than two and the retransmission is one of the first one or more retransmissions, the channel metric is SINR probability density. The amount of the uplink transmission resource is determined based on a maximum SINR from the SINR probability density.

In an embodiment of the disclosure, the channel metric is SINR probability density. Determining the channel metric comprises determining, for each of multiple predetermined SINR values, an observation probability for current period, based on an SINR value observed in the current period. Determining the channel metric further comprises calculating, for each predetermined SINR value, a weighted sum of the observation probability for the current period and an observation probability for previous period.

In an embodiment of the disclosure, a maximum/minimum one of the predetermined SINR values whose observation probabilities are greater than or equal to a predetermined threshold is selected as a maximum/minimum SINR from the SINR probability density.

In an embodiment of the disclosure, determining the uplink transmission format comprises determining, for each of multiple predetermined transmission formats, a product between a transport block size (TBS) under the predetermined transmission format and a success probability under the TBS and the maximum SINR. Determining the uplink transmission format further comprises determining, as the uplink transmission format, one of the multiple predetermined transmission formats that results in the largest product.

In an embodiment of the disclosure, determining the amount of the uplink transmission resource comprises determining an amount of MI per symbol based on the channel metric. Determining the amount of the uplink transmission resource further comprises calculating, as the amount of the uplink transmission resource, the amount of the residual MI divided by the amount of MI per symbol.

According to another aspect of the disclosure, there is provided a processing device for use in a base station. The processing device comprises: a channel metric determiner configured to determine a channel metric for indicating uplink channel condition between the base station and a terminal device. The processing device further comprises an transmission format determiner configured to determine an uplink transmission format that is to be used for an initial transmission from the terminal device, based on the channel metric such that a spectrum efficiency for the initial transmission can be maximized.

In an embodiment of the disclosure, the processing device further comprises a retransmission resource determiner configured to determine, for a retransmission for the initial transmission, an amount of residual MI which is to be transmitted in the retransmission, and to determine an amount of uplink transmission resource that is to be used for the retransmission from the terminal device, based on the channel metric and the amount of the residual MI.

In an embodiment of the disclosure, a maximum number of allowed retransmissions is one. The retransmission resource determiner is configured to determine the amount of the uplink transmission resource by determining the amount of the uplink transmission resource based on the channel metric and the amount of the residual MI such that a success probability for the retransmission can be maximized.

In an embodiment of the disclosure, a maximum number of allowed retransmissions is equal to or greater than two and the retransmission is one of the last one or more retransmissions. The retransmission resource determiner is configured to determine the amount of the uplink transmission resource by determining the amount of the uplink transmission resource based on the channel metric and the amount of the residual MI such that a success probability for the retransmission can be maximized.

In an embodiment of the disclosure, a maximum number of allowed retransmissions is equal to or greater than two and the retransmission is one of the first one or more retransmissions. The retransmission resource determiner is configured to determine the amount of the uplink transmission resource by determining the amount of the uplink transmission resource based on the channel metric and the amount of the residual MI such that a spectrum efficiency for the retransmission can be maximized.

In an embodiment of the disclosure, the channel metric is SINR probability density. The transmission format determiner is configured to determine the uplink transmission format based on a maximum SINR from the SINR probability density.

In an embodiment of the disclosure where a maximum number of allowed retransmissions is one, or where a maximum number of allowed retransmissions is equal to or greater than two and the retransmission is one of the last one or more retransmissions, the channel metric is SINR probability density. The retransmission resource determiner is configured to determine the amount of the uplink transmission resource based on a minimum SINR from the SINR probability density.

In an embodiment of the disclosure where a maximum number of allowed retransmissions is equal to or greater than two and the retransmission is one of the first one or more retransmissions, the channel metric is SINR probability density. The retransmission resource determiner is configured to determine the amount of the uplink transmission resource based on a maximum SINR from the SINR probability density.

In an embodiment of the disclosure, the channel metric is SINR probability density. The channel metric determiner is configured to determine the channel metric by determining, for each of multiple predetermined SINR values, an observation probability for current period, based on an SINR value observed in the current period. The channel metric determiner is configured to determine the channel metric by calculating, for each predetermined SINR value, a weighted sum of the observation probability for the current period and an observation probability for previous period.

In an embodiment of the disclosure, the channel metric determiner is further configured to select, as a maximum/minimum SINR from the SINR probability density, a maximum/minimum one of the predetermined SINR values whose observation probabilities are greater than or equal to a predetermined threshold.

In an embodiment of the disclosure, the transmission format determiner is configured to determine the uplink transmission format by determining, for each of multiple predetermined transmission formats, a product between a TBS under the predetermined transmission format and a success probability under the TBS and the maximum SINR. The transmission format determiner is configured to determine the uplink transmission format by determining, as the uplink transmission format, one of the multiple predetermined transmission formats that results in the largest product.

In an embodiment of the disclosure, the retransmission resource determiner is configured to determine the amount of the uplink transmission resource by determining an amount of MI per symbol based on the channel metric. The retransmission resource determiner is configured to determine the amount of the uplink transmission resource by calculating, as the amount of the uplink transmission resource, the amount of the residual MI divided by the amount of MI per symbol.

According to another aspect of the disclosure, there is provided a base station comprising the processing device according to the above aspect.

According to another aspect of the disclosure, there is provided a base station. The base comprises at least one processor and at least one memory. The at least one memory contains instructions executable by the at least one processor, whereby the base station is operative to determine a channel metric for indicating uplink channel condition between the base station and a terminal device. The base station is further operative to determine an uplink transmission format that is to be used for an initial transmission from the terminal device, based on the channel metric such that a spectrum efficiency for the initial transmission can be maximized.

In an embodiment of the disclosure, the base station is operative to perform the method according to the above aspect.

According to another aspect of the disclosure, there is provided a computer program product. The computer program product comprises instructions which when executed by at least one processor, cause the at least one processor to perform the method according to the above aspect.

According to another aspect of the disclosure, there is provided a computer readable storage medium. The computer readable storage medium comprises instructions which when executed by at least one processor, cause the at least one processor to perform the method according to the above aspect.

According to some embodiment(s) of the disclosure, the capacity of the uplink can be improved.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

The meaning of HARQ is to enhance the correctness of transmission. So normally in retransmission, PRB resource will not be reduced to avoid code rate raise. Therefore, the resource for other initial transmission will be reduced which causes capacity loss.

In summary, there is no clear method to decide how much PRB resource shall be used in retransmission. Traditional way is to use initial transmission's resource, but it is not necessary because there is some information received in previous transmission even though the decoding results are failed.

The present disclosure proposes improved solutions for uplink transmission control. These solutions may be applied to a wireless communication system including a terminal device and a base station. The terminal device can communicate through a radio access communication link with the base station. The base station can provide radio access communication links to terminal devices that are within its communication service cell. The base station may be, for example, an evolved node B (eNB) in LTE or a gNB in new radio (NR). Note that the communications may be performed between the terminal device and the base station according to any suitable communication standards and protocols. The terminal device may also be referred to as, for example, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3rd generation partnership project (3GPP) context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 1:
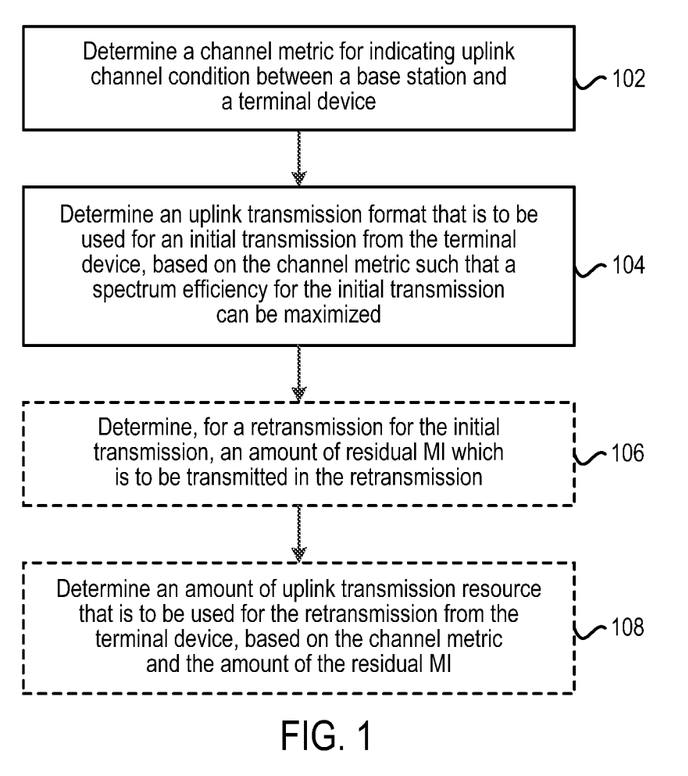
FIG. 1 is a flowchart illustrating a method implemented at a base station according to an embodiment of the disclosure.

Hereinafter, the solutions will be described in detail with reference to FIGS. 1-11. FIG. 1 is a flowchart illustrating a method implemented at a base station according to an embodiment of the disclosure. At block 102, a channel metric for indicating uplink channel condition between the base station and a terminal device is determined. For example, the channel metric may be signal to interference plus noise ratio (SINR) probability density. The determination of the SINR probability density may be implemented as blocks 210 and 212 of FIG. 2. At block 210, for each of multiple predetermined SINR values, an observation probability for current period is determined based on an SINR value observed in the current period. The period may take the form of one or more subframes or any other suitable time interval(s). The multiple predetermined SINR values may be used to quantize the observed SINR value. For example, the multiple predetermined SINR values may be uniformly distributed over a predetermined range within which the observed SINR value may usually fall. For the predetermined SINR value which is closest to the observed SINR value, the corresponding observation probability may be determined as one. For the remaining predetermined SINR values, the corresponding observation probabilities may be determined as zero. Note that if the observed SINR value is smaller than the lower limit of the predetermined range, it may be quantized as the lower limit. Likewise, if the observed SINR value is greater than the upper limit of the predetermined range, it may be quantized as the upper limit.

Figure 2:
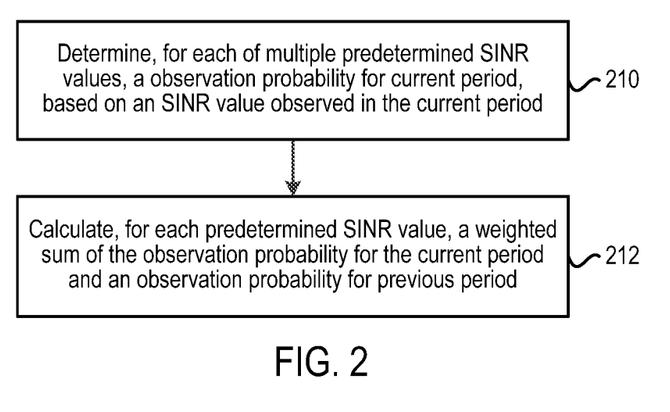
FIG. 2 is a flowchart for explaining the method of FIG. 1.

At block 212, for each predetermined SINR value, a weighted sum of the observation probability for the current period and an observation probability for previous period is calculated. For example, the weighted sum may be calculated as a sum of the observation probability for the current period multiplied by a first weighting factor and the observation probability for the previous period multiplied by a second weighting factor, where the sum of the first and second weighting factors is one. As a result, the SINR probability density for the current period may include the multiple predetermined SINR values and their corresponding weighted sums.

As an exemplary example, assume an SINR observation $x_i$ is obtained for the ith subframe. For quantizing $x_i$, there are a series of quantization SINR values with range (SinrMin, SinrMax), where the number of the quantization SINR values is M. Under the simplification of at $\sigma_j^2=0$ (where $\sigma$ is standard deviation), $\mu_j$ may be viewed as one of the M quantization SINR values and the quantization error is $\xi$. For example, if the M quantization SINR values are distributed over the range (−30 dB, 30 dB) with a uniform spacing of 0.01 dB, $\xi$ may be set as 0.01 dB. If the difference between $x_i$ and $\mu_j$ is less than $\xi$ (i.e. $|x_i-\mu_j|<\xi$), then $x_i$ may be determined as belonging to component $\omega_j$ whose value is $\mu_j$. As mentioned above, if $x_i>$SinrMax, $x_i$ belongs to the corresponding $\omega_j$ whose value $\mu_j=$SinrMax. Likewise, if $x_i<$SinrMin, $x_i$ belongs to the corresponding $\omega_j$ whose value $\mu_j=$SinrMin.

For $\omega_j$ which $x_i$ belongs to, the corresponding observation probability for the ith subframe $P_i(\omega_j)$ may be determined as one. For other $\omega$ which $x_i$ does not belong to, the corresponding $P_i$ may be determined as zero. That is, $$P_i = \begin{cases} 1, & x_i \in \omega_j \\ 0, & \text{other } \omega \end{cases}.$$

Then, for each $\omega$, the final observation probability for the ith subframe $P_i'$ may be calculated as:

$$P_i'=(1-\alpha)P_{i-1}'+\alpha \cdot P_i,$$

where $\alpha$ is the weighting factor for the ith subframe, $(1-\alpha)$ is the weighting factor for the (i−1)th subframe, and $P_{i-1}'$ is the final observation probability for the (i−1)th subframe.

For ease of explanation, suppose $\alpha=0.1$ and an SINR sample 5 dB (i.e. $\omega_j=5$ in the unit of dB) is observed for subframe 1. Thus, the final possibility $P_1'(5)=1$ since the possibility for any other $\omega$ is 0. Then, for subframe 2, suppose an SINR sample 10 dB is observed. According to the above equation, the following results may be obtained:

$$P_2'(5)=(1-\alpha)*1+\alpha*0=0.9,$$

$$P_2'(10)=(1-\alpha)*0+\alpha*1=0.1.$$

Then, suppose an SINR sample 3 dB is observed for subframe 3. Likewise, the following results may be obtained:

$$P_3'(5)=(1-\alpha)*0.9+\alpha*0=0.81,$$

$$P_3'(10)=(1-\alpha)*0.1+\alpha*0=0.09,$$

$$P_3'(3)=(1-\alpha)*0+\alpha*1=0.1.$$

It should be noted that the present disclosure is not limited to the above example in the determination of the channel metric. Any other SINR estimation technique for use in link adaptation (LA) may be used instead for this purpose, where LA may be used to determine how much MI shall be transmitted in information theory perspective.

Referring back to FIG. 1, at block 104, an uplink transmission format that is to be used for an initial transmission from the terminal device is determined based on the channel metric such that a spectrum efficiency for the initial transmission can be maximized. The uplink transmission format may be modulation and coding scheme (MCS) or any other suitable format for defining the uplink transmission. In the case that the channel metric is SINR probability density, to maximize the spectrum efficiency for the initial transmission, the maximum SINR from the SINR probability density may be used to determine the uplink transmission format. As an example, a maximum one of the predetermined SINR values whose observation probabilities are greater than or equal to a predetermined threshold may be selected as the maximum SINR from the SINR probability density.

Figure 3:
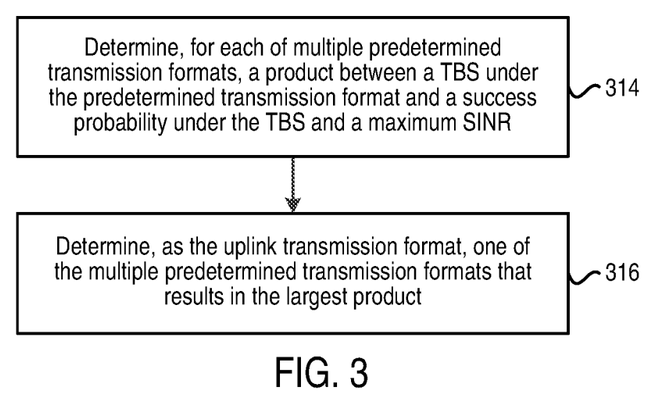
FIG. 3 is a flowchart for explaining the method of FIG. 1.

For example, block 104 may be implemented as blocks 314 and 316 of FIG. 3. At block 314, for each of multiple predetermined transmission formats, a product between a transport block size (TBS) under the predetermined transmission format and a success probability under the TBS and the maximum SINR is determined. In the case that the transmission format is MCS, the product may be represented as:

$$TBS_i'=(1-BLER(TBS(MCS_i),\omega_{max}))*TBS(MCS_i),$$

where $TBS_i'$ is the product (which is a weighted TBS), $MCS_i$ is one of the multiple predetermined MCSs, i is MCS index, $TBS(MCS_i)$ is the TBS under the $MCS_i$, $\omega_{max}$ is the maximum SINR from the SINR probability density, and BLER $(TBS(MCS_i), \omega_{max})$ is the block error rate under the TBS $(MCS_i)$ and $\omega_{max}$, which means $(1-BLER(TBS(MCS_i), \omega_{max}))$ is the success probability under the $TBS(MCS_i)$ and $\omega_{max}$. The $TBS(MCS_i)$ may be determined by performing a lookup operation on a table reflecting the correspondence between MCS and TBS, such as the table defined in 3GPP TS 36.213. Similarly, $BLER(TBS(MCS_i), \omega_{max})$ may be determined by performing a lookup operation on a table which may be obtained by simulation to reflect the correspondence between BLER and a combination of MCS and $\omega_{max}$. At block 316, one of the multiple predetermined transmission formats that results in the largest product is determined as the uplink transmission format.

Blocks 314 and 316 may be performed in various ways. As an example, the MCS index i takes the value of 0 initially such that $TBS_{i=0}'$ is calculated according to the above equation. Then, i increments by one (i.e. i=i+1) such that $TBS_{i+1=1}'$ is calculated. If $TBS_{i+1}'$ is greater than $TBS_i'$, then the value of $TBS_{i+1}'$ is assigned to $TBS_i'$ and i increments by one again such that $TBS_{i+1}'$ is calculated. As long as $TBS_{i+1}'$ is greater than $TBS_i'$, the assignment and increment are performed. If i reaches N such that $TBS_{N+1}'$ is smaller than or equal to $TBS_N'$, then $MCS_N$ may be determined as the uplink transmission format. In this exemplary example, the number of the multiple predetermined transmission formats is N+2. Since the SINR density may be calculated for every period (e.g. every subframe), the maximum weighted TBS may be found and the corresponding MCS may used for the upcoming transmission once the SINR density is updated.

As shown in FIG. 1, if the initial transmission is not correctly received by the base station, the method may optionally comprise blocks 106 and 108. At block 106, for a retransmission for the initial transmission, an amount of residual mutual information (MI) which is to be transmitted in the retransmission is determined. For the first retransmission, the amount of the residual MI may be calculated as: the amount of the initial MI minus the amount of the received MI from the initial transmission. The amount of the initial MI may be estimated from the channel metric (e.g. SINR) according to Shannon formula. The received MI from the initial transmission may refer to the MI correctly decoded from the initial transmission. For the ith retransmission (where i≥2), the amount of the residual MI may be calculated as: the amount of the residual MI for the (i−1)th retransmission minus the amount of the received MI from the (i−1)th retransmission.

Figure 4:
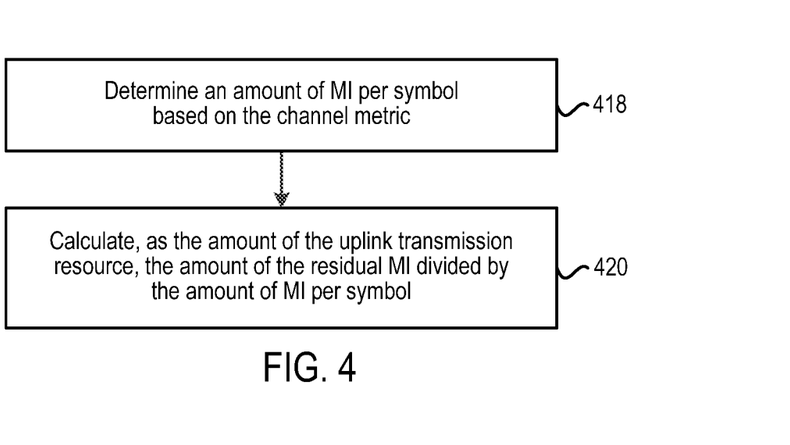
FIG. 4 is a flowchart for explaining the method of FIG. 1.

At block 108, an amount of uplink transmission resource that is to be used for the retransmission from the terminal device is determined based on the channel metric and the amount of the residual MI. For example, block 108 may be implemented as blocks 418 and 420 of FIG. 4. At block 418, an amount of MI per symbol is determined based on the channel metric. This amount may be calculated from the channel metric (e.g. SINR) according to Shannon formula. At block 420, the amount of the residual MI divided by the amount of MI per symbol is calculated as the amount of the uplink transmission resource. In the case that the transmission resource takes the form of physical resource block (PRB), the amount of the uplink transmission resource $N_{PRB}$ may be represented as:

$$N_{PRB} = \frac{MI_{previous\_estimation} - MI_{received}}{MI_{per\ symbol}},$$

where $MI_{previous\_estimation}$ is the initial MI for the first transmission and is the residual MI for the (i−1)th retransmission and $MI_{received}$ is the received MI from the (i−1)th retransmission, as described above.

Thus, the present disclosure also provides a method for uplink retransmission control. The method comprises at least blocks 102, 106 and 108. Thus, if decoding failure happens in the initial transmission, the received amount of MI may be obtained from the transmission which results in the failed decoding. Compare to the amount of MI estimated for the initial transmission, the residual MI amount may be obtained. In retransmission scheduling, PRB resource only needs to cover the residual MI amount which utilizes the PRB resource. In this way, the PRB resource allocation in retransmission can be improved to obtain more throughput gain. Note that in this case, for the initial uplink transmission control, block 104 may be used, or any other LA techniques may be used instead.

Figure 5:
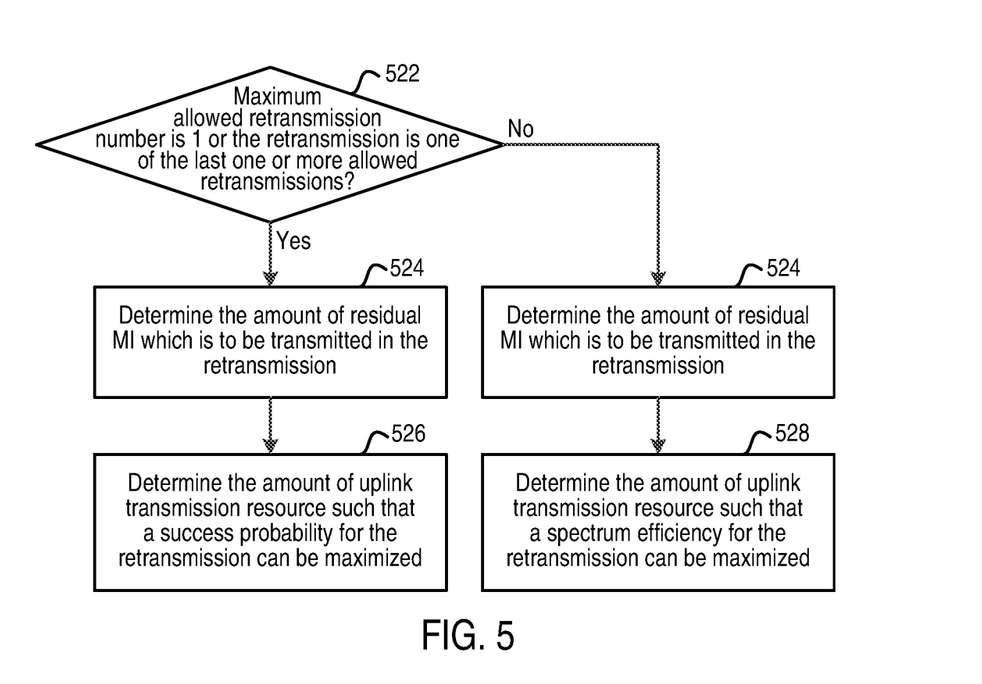
FIG. 5 is a flowchart illustrating a method for uplink retransmission control according to an embodiment of the disclosure.

FIG. 5 is a flowchart illustrating a method for uplink retransmission control according to an embodiment of the disclosure. This flowchart may be used for explaining blocks 106 and 108 of FIG. 1. At block 522, it is determined whether a maximum number of allowed retransmissions is one or whether the maximum number of allowed retransmissions is equal to or greater than two and the retransmission is one of the last one or more retransmissions. If the result of the determination at block 522 is positive (i.e. the result is that the maximum number of allowed retransmissions is one, or the result is that the maximum number of allowed retransmissions is equal to or greater than two and the retransmission is one of the last one or more retransmissions), an amount of residual MI which is to be transmitted in the retransmission is determined at block 524. This block may be similar to block 106 and its details are omitted here. At block 526, the amount of the uplink transmission resource is determined based on the channel metric and the amount of the residual MI such that a success probability for the retransmission can be maximized. In the case that the channel metric is SINR probability density, to maximize the success probability for the retransmission, the minimum SINR from the SINR probability density may be used to determine the amount of the uplink transmission resource.

On the other hand, if the result of the determination at block 522 is negative (i.e. the result is that the maximum number of allowed retransmissions is equal to or greater than two and the retransmission is one of the first one or more retransmissions), the amount of residual MI which is to be transmitted in the retransmission is determined at block 524. At block 528, the amount of the uplink transmission resource is determined based on the channel metric and the amount of the residual MI such that a spectrum efficiency for the retransmission can be maximized. In the case that the channel metric is SINR probability density, to maximize the spectrum efficiency for the retransmission, the maximum SINR from the SINR probability density may be used to determine the amount of the uplink transmission resource. It should be noted that two blocks shown in succession in the above figures may, in fact, be executed substantially concurrently, or the blocks may sometimes be executed in the reverse order, depending upon the functionality involved.

Figure 6A:
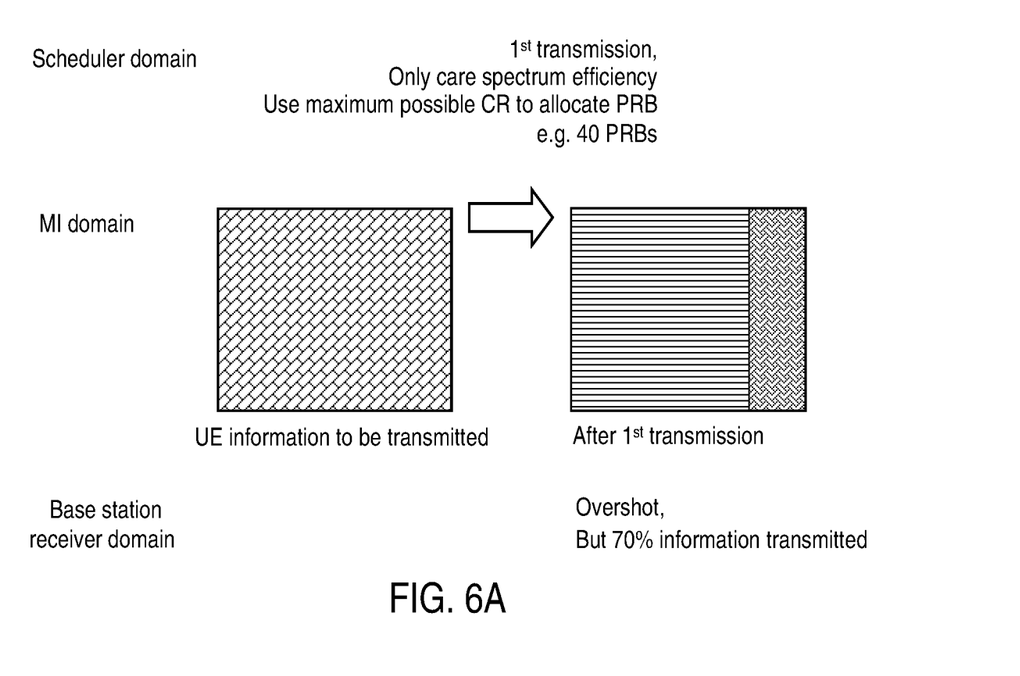
FIGS. 6A-6C are schematic diagrams illustrating an exemplary solution according to an embodiment of the disclosure.
Figure 6B:
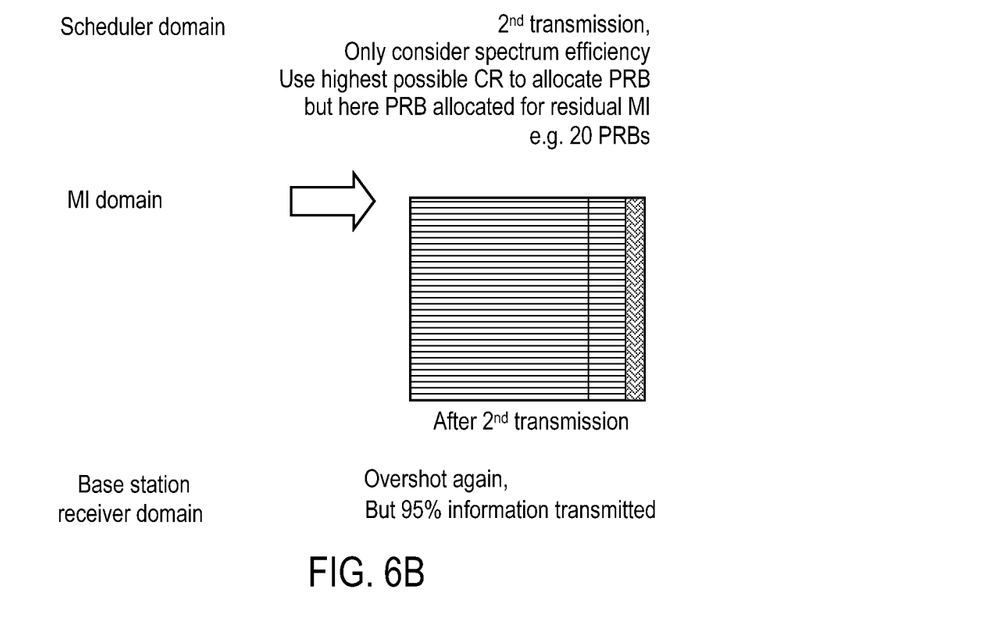
Figure 6C:
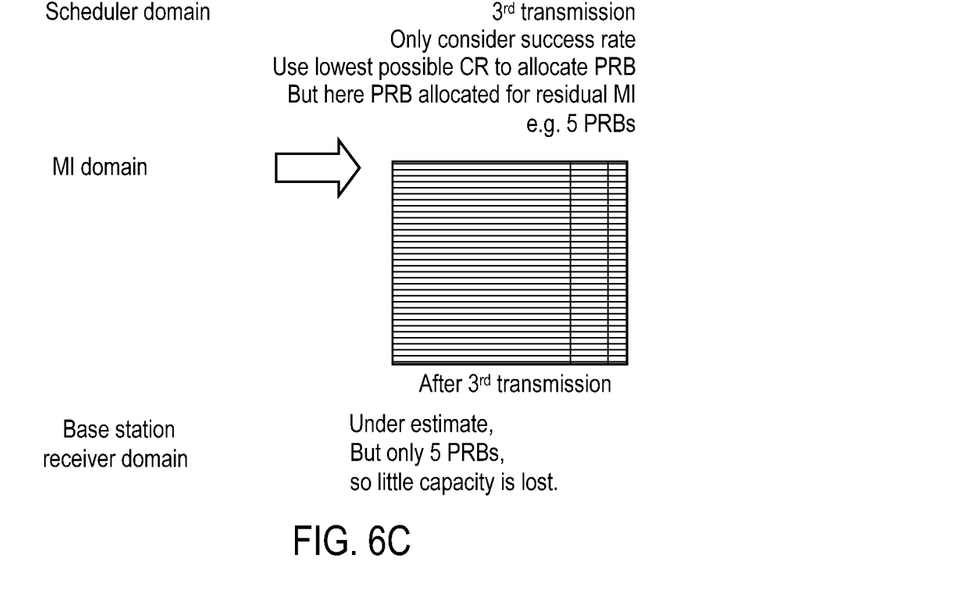

FIGS. 6A-6C are schematic diagrams illustrating an exemplary solution according to an embodiment of the disclosure. In this exemplary solution, it is assumed that the UE information is transmitted to the base station through an initial transmission and two retransmissions. As shown in FIG. 6A, in the scheduler domain, for the initial (or the first) transmission, only spectrum efficiency is considered. To maximize the spectrum efficiency, the maximum possible coding rate (CR) is used to allocate PRB. For example, 40 PRBs may be allocated for the initial transmission. In the MI domain, the rectangle on the left side represents the UE information to be transmitted in the initial transmission. As shown in the base station (e.g. eNB) receiver domain, since overshot (or overestimation) is made due to the maximum possible CR, not all the information is correctly received by the base station. But 70% information may be transmitted to the base station, which is indicated in the rectangle on the right side in the MI domain, where the portion filled with multiple horizontal lines represents the information correctly received by the base station.

As shown in FIG. 6B, in the scheduler domain, for the second transmission (the first retransmission), only spectrum efficiency is considered. To maximize the spectrum efficiency, the maximum (or highest) possible CR is used to allocate PRB. But unlike the legacy solution, PRB is allocated for residual MI. For example, 20 PRBs may be allocated for the second transmission. In the base station receiver domain, since overshot (or overestimation) is made due to the maximum possible CR, not all the residual MI is correctly received by the base station. But 95% information may be transmitted to the base station, which is indicated in the rectangle in the MI domain.

As shown in FIG. 6C, in the scheduler domain, for the third transmission (the second retransmission), only success rate (or success probability) is considered. To maximize the success rate, the minimum (or lowest) possible CR is used to allocate PRB. But unlike the legacy solution, PRB is allocated for the residual MI. For example, 5 PRBs may be allocated for the third transmission. In the base station receiver domain, since under estimation is made due to the minimum possible CR, all the residual MI is correctly received by the base station, which is indicated in the rectangle in the MI domain. Since only 5 PRBs are allocated, little capacity is lost.

Thus, an enhanced uplink retransmission solution can be provided. It focuses spectrum efficiency on the initial and second transmissions which will increase the total retransmission number. Although one overshot transmission may increase latency, total file transmission latency may be reduced if multiple overshot transmissions are used in high load condition. Thus, this solution is a tradeoff between throughput and latency since the throughput gain is drilled from the latency (or retransmission). This means the above solution is quite flexible to any kind of quality of service (QoS). If latency requires keeping a packet in total 4 or 5 transmissions, the spectrum efficiency can still be the only considering factor for the first 3 transmissions.

Figure 7:
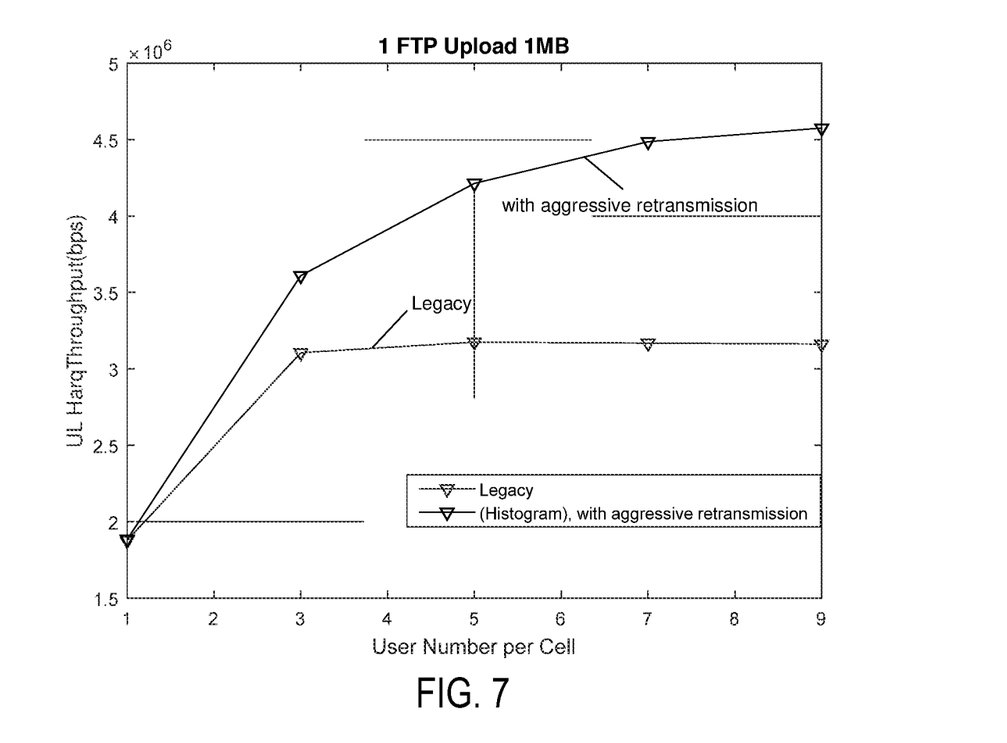
FIGS. 7-8 are diagrams each showing the performance of an embodiment of the disclosure versus that of the legacy solution.
Figure 8:
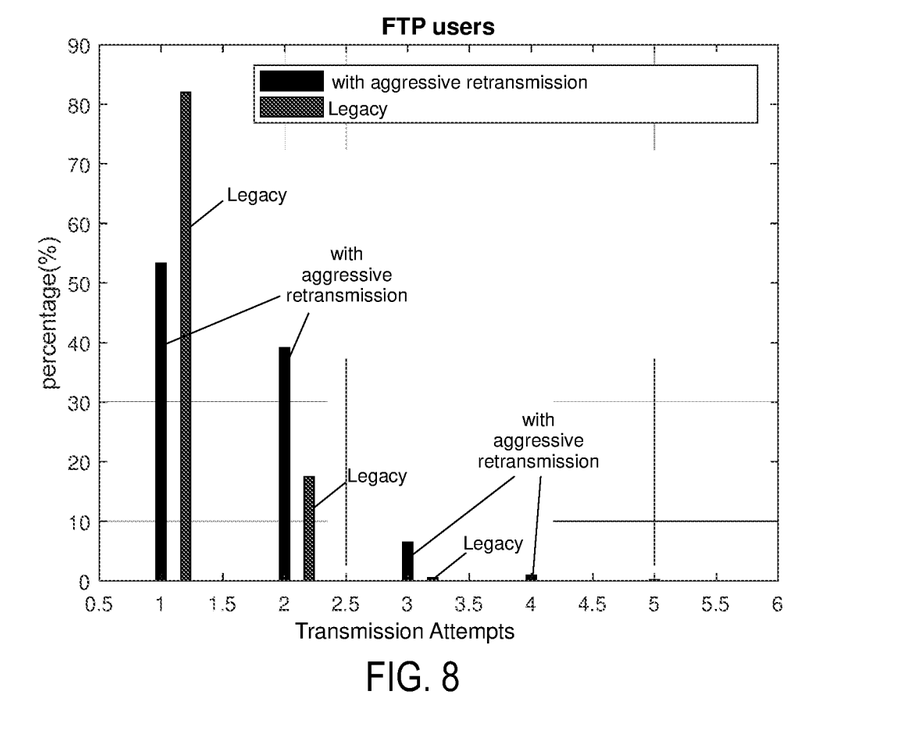

FIGS. 7-8 are diagrams each showing the performance of an embodiment of the disclosure versus that of the legacy solution. FIG. 7 shows the throughput performance and FIG. 8 shows the transmission attempts. These performances were simulated for the scenario where file transfer protocol (FTP) is used to upload 1 MB by using LTE. The legacy solution uses a fixed BLER target for the first transmission. The embodiment only maximizes the spectrum efficiency for the first 3 transmissions, while keeping BLER for the fourth transmission. As shown in FIG. 7, because one UE can receive one scheduling command per transmission time interval (TTI) due to the restriction from LTE standard, the embodiment (the aggressive retransmission solution) does not show gains in low load condition. Although the embodiment saves PRB, but no other UE can utilize this PRB. However, when the load is high (as the number of users per cell increases), the gain of the embodiment becomes obvious. As shown in FIG. 8, for transmitting the same information, the legacy solution generally takes 2 transmissions while the embodiment generally takes three transmissions. This means that the throughput gain is from the retransmission.

Figure 9:
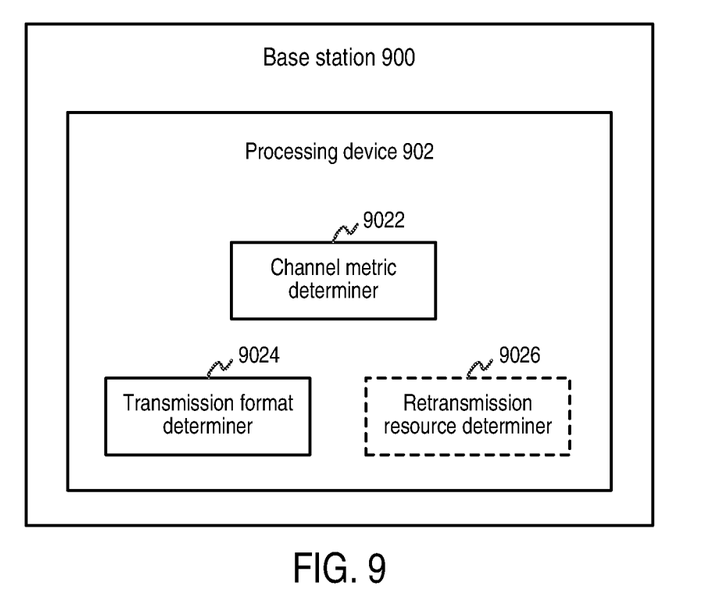
FIG. 9 is a block diagram showing a processing device and a base station according to an embodiment of the disclosure.

FIG. 9 is a block diagram showing a processing device and a base station according to an embodiment of the disclosure. For example, the processing device may be a baseband processing circuit or a portion thereof. The processing device may be implemented as various integrated circuits such as field programmable gate array (FPGA). As shown, the processing device 902 comprises a channel metric determiner 9022, a transmission format determiner 9024 and optionally a retransmission resource determiner 9026. The channel metric determiner 9022 is configured to determine a channel metric for indicating uplink channel condition between the base station and a terminal device. The channel metric determiner 9022 may be implemented as described above with respect to blocks 210 and 212 of FIG. 2. Optionally, the channel metric determiner 9022 may be configured to select, as a maximum/minimum SINR from the SINR probability density, a maximum/minimum one of the predetermined SINR values whose observation probabilities are greater than or equal to a predetermined threshold. The transmission format determiner 9024 is configured to determine an uplink transmission format that is to be used for an initial transmission from the terminal device, based on the channel metric such that a spectrum efficiency for the initial transmission can be maximized. The transmission format determiner 9024 may be implemented as described above with respect to blocks 314 and 316 of FIG. 3.

The retransmission resource determiner 9026 may be configured to determine, for a retransmission for the initial transmission, an amount of residual MI which is to be transmitted in the retransmission, and to determine an amount of uplink transmission resource that is to be used for the retransmission from the terminal device, based on the channel metric and the amount of the residual MI. The retransmission resource determiner 9026 may be implemented as described above with respect to blocks 418 and 420 of FIG. 4. As an exemplary example, the retransmission resource determiner 9026 may be configured to perform blocks 522-528 of FIG. 5. As shown in FIG. 9, the present disclosure also provides a base station 900 comprising the processing device 902. Other configurations of the base station may be well known to those skilled in the art and their detailed description is omitted here. It should be noted that the present disclosure is not limited to the above example. In another embodiment, the present disclosure also provides a processing device comprising the channel metric determiner 9022 and the retransmission resource determiner 9026. In this case, for the initial transmission, the transmission format determiner 9024 may be used, or any other LA modules may be used instead.

Figure 10:
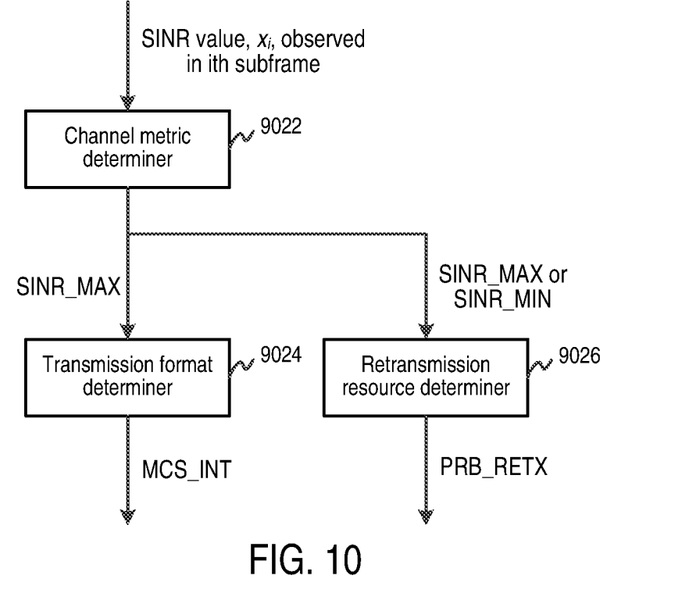
FIG. 10 is a diagram showing an exemplary configuration of the processing device of FIG. 9.

FIG. 10 is a diagram showing an exemplary configuration of the processing device of FIG. 9. In this exemplary configuration, the channel metric is an SINR probability density, the transmission format is MCS, and the transmission resource is PRB. Once an SINR value is observed for the ith subframe, it may go to the channel metric determiner 9022 to update the SINR density. Then maximum or minimum SINR may be selected based on the transmission state (initial transmission or retransmission) and go to the transmission format determiner 9024 or the retransmission resource determiner 9026. The maximum SINR is input to the transmission format determiner 9024 such that the MSC for the initial transmission (MCS_INT) may be output. The maximum SINR or minimum SINR is input to the retransmission resource determiner 9026 such that the amount of the PRB for the retransmission (PRB_RETX) may be output. The maximum SINR may be used for the first one or more retransmissions and the minimum SINR may be used for the last one or more retransmissions.

Figure 11:
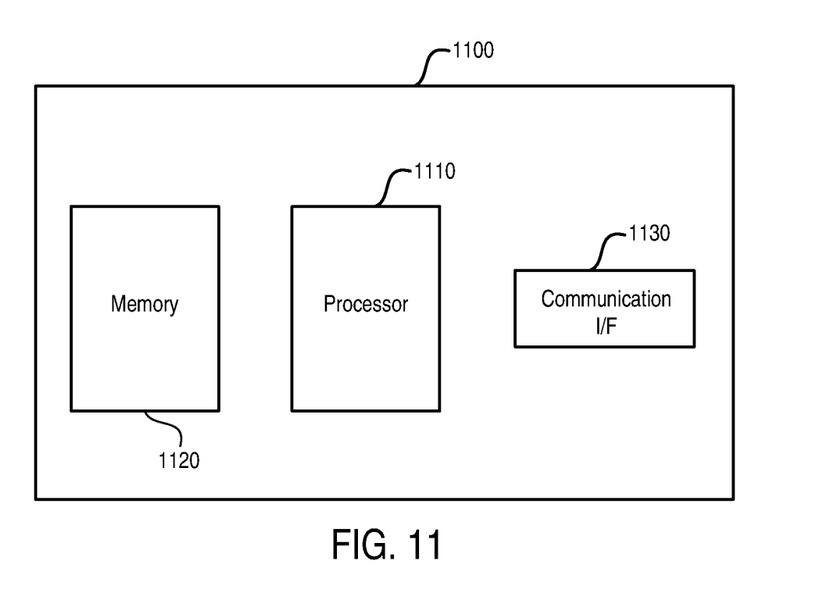
FIG. 11 is a block diagram showing an apparatus suitable for use in practicing some embodiments of the disclosure.

FIG. 11 is a block diagram showing an apparatus suitable for use in practicing some embodiments of the disclosure. For example, the base station described above may be implemented through the apparatus 1100. As shown, the apparatus 1100 may include a processor 1110, a memory 1120 that stores a program, and a communication interface 1130 for communicating data with other external devices through wired and/or wireless communication.

The program includes program instructions that, when executed by the processor 1110, enable the apparatus 1100 to operate in accordance with the embodiments of the present disclosure, as discussed above. That is, the embodiments of the present disclosure may be implemented at least in part by computer software executable by the processor 1110, or by hardware, or by a combination of software and hardware.

The memory 1120 may be of any type suitable to the local technical environment and may be implemented using any suitable data storage technology, such as semiconductor based memory devices, flash memories, magnetic memory devices and systems, optical memory devices and systems, fixed memories and removable memories. The processor 1110 may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a base station, the method comprising:
    determining a channel metric for indicating uplink channel condition between the base station and a terminal device;
    determining an uplink transmission format that is to be used for an initial transmission from the terminal device, based on the channel metric such that a spectrum efficiency for the initial transmission can be maximized;
    determining, for a retransmission for the initial transmission, an amount of residual mutual information, MI, which is to be transmitted in the retransmission; and
    determining an amount of uplink transmission resource that is to be used for the retransmission from the terminal device, based on the channel metric and the amount of the residual MI.

2. The method according to claim 1, wherein a maximum number of allowed retransmissions is one; and
    wherein determining the amount of the uplink transmission resource comprises:
    determining the amount of the uplink transmission resource based on the channel metric and the amount of the residual MI such that a success probability for the retransmission can be maximized.

3. The method according to claim 2, wherein the channel metric is SINR probability density; and
    wherein the amount of the uplink transmission resource is determined based on a minimum SINR from the SINR probability density.

4. The method according to claim 1, wherein a maximum number of allowed retransmissions is equal to or greater than two and the retransmission is one of the last one or more retransmissions; and
    wherein determining the amount of the uplink transmission resource comprises:
    determining the amount of the uplink transmission resource based on the channel metric and the amount of the residual MI such that a success probability for the retransmission can be maximized.

5. The method according to claim 1, wherein a maximum number of allowed retransmissions is equal to or greater than two and the retransmission is one of the first one or more retransmissions; and
wherein determining the amount of the uplink transmission resource comprises:
determining the amount of the uplink transmission resource based on the channel metric and the amount of the residual MI such that a spectrum efficiency for the retransmission can be maximized.

6. The method according to claim 5, wherein the channel metric is SINR probability density; and
wherein the amount of the uplink transmission resource is determined based on a maximum SINR from the SINR probability density.

7. The method according to claim 1, wherein the channel metric is signal to interference plus noise ratio, SINR, probability density; and
wherein the uplink transmission format is determined based on a maximum SINR from the SINR probability density.

8. The method according to claim 7, wherein determining the uplink transmission format comprises:
determining, for each of multiple predetermined transmission formats, a product between a transport block size, TBS, under the predetermined transmission format and a success probability under the TBS and the maximum SINR; and
determining, as the uplink transmission format, one of the multiple predetermined transmission formats that results in a largest product.

9. The method according claim 1, wherein the channel metric is SINR probability density; and
wherein determining the channel metric comprises:
determining, for each of multiple predetermined SINR values, an observation probability for a current period, based on an SINR value observed in the current period; and
calculating, for each predetermined SINR value, a weighted sum of the observation probability for the current period and an observation probability for a previous period.

10. The method according to claim 9, wherein a maximum/minimum one of the predetermined SINR values whose observation probabilities are greater than or equal to a predetermined threshold is selected as a maximum/minimum SINR from the SINR probability density.

11. The method according to claim 1, wherein determining the amount of the uplink transmission resource comprises:
determining an amount of MI per symbol based on the channel metric; and
calculating, as the amount of the uplink transmission resource, the amount of the residual MI divided by the amount of MI per symbol.

12. A base station comprising:
at least one processor; and
at least one memory, the at least one memory including instructions executable by the at least one processor, whereby the base station is operative to:
determine a channel metric for indicating uplink channel condition between the base station and a terminal device;
determine an uplink transmission format that is to be used for an initial transmission from the terminal device, based on the channel metric such that a spectrum efficiency for the initial transmission can be maximized; and
determine, for a retransmission for the initial transmission, an amount of residual mutual information, MI, which is to be transmitted in the retransmission, and to determine an amount of uplink transmission resource that is to be used for the retransmission from the terminal device, based on the channel metric and the amount of the residual MI.

13. The base station according to claim 12, wherein a maximum number of allowed retransmissions is one; and
wherein the base station is operative to determine the amount of the uplink transmission resource by:
determining the amount of the uplink transmission resource based on the channel metric and the amount of the residual MI such that a success probability for the retransmission can be maximized.

14. The base station according to claim 13, wherein the channel metric is SINR probability density; and
wherein the base station is operative to determine the amount of the uplink transmission resource based on a minimum SINR from the SINR probability density.

15. The base station according to claim 12, wherein a maximum number of allowed retransmissions is equal to or greater than two and the retransmission is one of the last one or more retransmissions; and
wherein the base station is operative to determine the amount of the uplink transmission resource by:
determining the amount of the uplink transmission resource based on the channel metric and the amount of the residual MI such that a success probability for the retransmission can be maximized.

16. The base station according to claim 12, wherein a maximum number of allowed retransmissions is equal to or greater than two and the retransmission is one of the first one or more retransmissions; and
wherein the base station is operative to determine the amount of the uplink transmission resource by:
determining the amount of the uplink transmission resource based on the channel metric and the amount of the residual MI such that a spectrum efficiency for the retransmission can be maximized.

17. The base station according to claim 16, wherein the channel metric is SINR probability density; and
wherein the base station is operative to determine the amount of the uplink transmission resource based on a maximum SINR from the SINR probability density.

18. The base station according to claim 12, wherein the channel metric is signal to interference plus noise ratio, SINR, probability density; and
wherein the base station is operative to determine the uplink transmission format based on a maximum SINR from the SINR probability density.

* * * * *